(12) United States Patent
Hama

(10) Patent No.: US 7,261,031 B2
(45) Date of Patent: Aug. 28, 2007

(54) ACTUATING DEVICE

(75) Inventor: Tomio Hama, Okaya (JP)

(73) Assignee: Yugen Kaisha Hama International, Okaya-Shi (JP)

( * ) Notice: Subject to any disclaimer, the term of this patent is extended or adjusted under 35 U.S.C. 154(b) by 286 days.

(21) Appl. No.: 11/127,166

(22) Filed: May 12, 2005

(65) Prior Publication Data

US 2005/0252371 A1 Nov. 17, 2005

(30) Foreign Application Priority Data

May 14, 2004 (JP) .............................. 2004-145394

(51) Int. Cl.
*F15B 15/26* (2006.01)
(52) U.S. Cl. ........................................... 92/19; 384/57
(58) Field of Classification Search .................... 92/15, 92/18–20, 23, 88; 188/33, 38, 43, 62; 384/54, 384/57, 58

See application file for complete search history.

(56) References Cited

U.S. PATENT DOCUMENTS 5,547,285 A * 8/1996 Hutzel et al. ................. 384/45
6,912,947 B2 * 7/2005 Van Der Vorst ................ 92/19

FOREIGN PATENT DOCUMENTS

| JP | 07-054843 A | 2/1995 |
|---|---|---|
| JP | 2002-122136 A | 4/2002 |

* cited by examiner

*Primary Examiner*—Michael Leslie
(74) *Attorney, Agent, or Firm*—Birch, Stewart, Kolasch & Birch, LLP

(57) ABSTRACT

The actuating device is capable of automatically eliminating a clearance between a contact body and a rail. The actuating device comprises: a moving body guided by the rail; the contact body contacting the rail; and a pressure unit biasing the contact body toward the rail or in a pressing direction. The pressure unit comprises: a rod having one end, which contacts the moving body, and the other end, the rod being capable of moving in the pressing direction; a first biasing member biasing the rod; a casing covering an outer face of the rod, the casing having an inner face, whose distance from the outer face of the rod is gradually reduced toward the other end of the rod; and a spherical body contacting the inner face of the casing and the outer face of the rod.

10 Claims, 7 Drawing Sheets

ACTUATING DEVICE

BACKGROUND OF THE INVENTION

The present invention relates to an actuating device, more precisely relates to an actuating device having a moving body, which is moved and guided by a rail or a guide section.

In conventional actuating devices having moving bodies guided by rails, the moving bodies are pressed onto the rails so as to smoothly move the moving bodies without plays.

One of the conventional actuating devices is disclosed in Japanese Patent Gazette No. 2002-122136. Balls are provided between a rail and a moving body. The moving body is moved along the rail by rolling the balls (see paragraphs 0002 and 0019 and FIGS. 1 and 2). The balls, whose sizes are slightly larger than a clearance between the moving body and the rail, are fitted in the clearance so as to apply a pressing force to the moving body and the rail (see the paragraph 0002).

By the method of applying the pressing force disclosed in the Japanese gazette, the clearance between the rail and the moving body is filled with the balls, so that plays can be removed. Therefore, even heavy goods, whose weight are several hundred Kg or more, can be smoothly conveyed by the actuating device.

However, in the actuating device disclosed in the Japanese gazette, the balls, whose sizes are larger than the clearance between the metallic rail and the moving body, are fitted in the clearance, so that the balls are deformed. Thus, rolling resistances of the balls or a dynamic resistance of the moving body must be increased, and energy consumption for moving the moving body must be large. The rail, the moving body and the balls must have high durability, and they must be case-hardened so that a manufacturing cost of the device must be increased. To generate a great driving force, the device must be large and heavy. Further, a large amount of lubricant must be frequently applied so as to reduce the rolling resistances and prevent damage of the rail, the moving body and the balls, so that a running cost and a maintenance cost of the device must be increased.

In case of conveying light goods, the large and high cost device disclosed in Japanese Patent Gazette No. 2002-122136 is not required. For example, an actuating device for conveying light goods is disclosed in Japanese Patent Gazette No. 7-54843. The actuating device comprises: a moving body; a rail for guiding the moving body; contact bodies, which are provided to the moving body and contact the rail; and biasing members for pressing the contact bodies onto the rail (see a paragraph 0078 and FIGS. 1 and 2).

By the method of pressing the contact bodies onto the rail, a dynamic resistance of the moving body can be smaller than that of the device disclosed in Japanese Patent Gazette No. 2002-122136. Further, the device can be made of light materials, and a manufacturing cost, a running cost and a maintenance cost of the device can be reduced.

However, when an external force, which is greater than elasticity of the biasing members, is applied to the contact bodies, the biasing members are deformed so that the moving body cannot be moved smoothly.

To solve this problem, the biasing members having great elasticity may be employed so as to increase the force for pressing the contact bodies onto the rail. However, frictional resistances between the contact bodies and the rail must be increased, so that the biasing members must be large, the device must be large and heavy, the manufacturing cost and energy consumption of the device must be increased.

SUMMARY OF THE INVENTION

The present invention has been invented to solve the problems of the conventional actuating devices.

An object of the present invention is to provide an actuating device, which is capable of automatically eliminating a clearance between a contact body and a rail and smoothly moving the moving body without increasing a force for pressing the contact body even if the contact body and the rail are abraded.

To achieve the object, the present invention has following structures.

A basic structure of the actuating device of the present invention comprises:
  a fixed rail;
  a moving body being guided by the rail;
  a contact body contacting the rail; and
  a pressure unit being provided to the moving body, the pressure unit always biasing the contact body toward the rail or in a pressing direction, and
  the pressure unit comprises:
  a rod having one end, which directly or indirectly contacts the moving body, and the other end, the rod being capable of moving in the pressing direction;
  a first biasing member biasing the rod in the pressing direction;
  a casing covering at least a part of an outer circumferential face of the rod, the casing having an inner circumferential face, whose distance from the outer circumferential face of the rod is gradually reduced toward the other end of the rod; and
  a spherical body being provided in the casing, the spherical body contacting the inner circumferential face of the casing and the outer circumferential face of the rod.

With this structure, the first biasing member of the pressure unit presses the contact body onto the rail with the rod. When a clearance is formed between the rail and the contact body by abrasion, the contact body is moved until contacting the rail, together with the rod, by the elasticity of the first biasing member, so that the clearance can be eliminated. On the other hand, when a reverse force is applied from the rail to the rod against the elasticity of the first biasing member, the spherical body contacts the inner circumferential face of the casing and the outer circumferential face of the rod. Since the distance between the both circumferential faces is gradually reduced in the pressing direction, the reverse movement of the rod can be prohibited by engagement of the spherical body with the both circumferential faces.

Therefore, the clearance formed by abrasion can be automatically eliminated, and the rod is not moved in the reverse direction; even if a great force is applied to the contact body and the rod, no clearance is formed between the contact body and the rail, so that the moving body can be moved without plays. Further, the first biasing member is provided to move the rod so as to eliminate the clearance, which is formed between the rail and the contact body by abrasion, so great elasticity is not required.

Another basic structure of the actuating device of the present invention comprises:
  a fixed guide section;
  a moving body being guided by the guide section;
  a contact body contacting the moving body; and
  a pressure unit being provided to the base, the pressure unit always biasing the contact body toward the moving body or in a pressing direction, and
  the pressure unit comprises:

a rod having one end, which directly or indirectly contacts the moving body, and the other end, the rod being capable of moving in the pressing direction;

a first biasing member biasing the rod in the pressing direction;

a casing covering at least a part of an outer circumferential face of the rod, the casing having an inner circumferential face, whose distance from the outer circumferential face of the rod is gradually reduced toward the other end of the rod; and a spherical body being provided in the casing, the spherical body contacting the inner circumferential face of the casing and the outer circumferential face of the rod.

With this structure, the first biasing member of the pressure unit presses the contact body onto the moving body with the rod. When a clearance is formed between the moving body and the contact body by abrasion, the contact body is moved until contacting the moving body, together with the rod, by the elasticity of the first biasing member, so that the clearance can be eliminated. On the other hand, when a reverse force is applied from the moving body to the rod against the elasticity of the first biasing member, the spherical body contacts the inner circumferential face of the casing and the outer circumferential face of the rod. Since the distance between the both circumferential faces is gradually reduced in the pressing direction, the reverse movement of the rod can be prohibited by engagement of the spherical body with the both circumferential faces.

Therefore, the clearance formed by abrasion can be automatically eliminated, and the rod is not moved in the reverse direction; even if a great force is applied to the contact body and the rod, no clearance is formed between the contact body and the rail, so that the moving body can be moved without plays. Further, the first biasing member is provided to move the rod so as to eliminate the clearance, which is formed between the moving body and the contact body by abrasion, so great elasticity is not required.

In the actuating device of the present invention, the pressure unit may further have a second biasing member biasing the spherical body in the direction opposite to the pressing direction. With this structure, the spherical body is always biased, by the second biasing member, to contact the rod and the inner circumferential face of the casing. Even if a reverse force is applied to the rod against the elasticity of the first biasing member, the reverse movement of the rod can be quickly prohibited.

In the actuating device of the present invention, a plurality of the spherical bodies may be arranged along the outer circumferential face of the rod. With this structure, when a reverse force is applied to the rod against the elasticity of the first biasing member, the force is dispersed to a plurality of the spherical bodies, so that damaging the rod, the casing and the spherical bodies can be prevented. Further, stable operation of the actuating device can be realized.

In the actuating device of the present invention, the pressure unit may further have a releasing member being provided on the other end side with respect to the spherical body and capable of moving the spherical body in the pressing direction when the releasing member is moved in the pressing direction. With this structure, the prohibition of the movement of the rod can be released by moving the spherical body in the pressing direction with the releasing member.

In the actuating device of the present invention, the pressure unit may further have a third biasing member always biasing the releasing member in the direction opposite to the pressing direction. With this structure, the releasing member can be provided without contacting the spherical body.

In the actuating device of the present invention, even if the clearance is formed between the contact body and the rail or the moving body by their abrasion, the clearance and plays of the moving body can be automatically eliminated without increasing the biasing force of the pressure unit.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

First Embodiment

Figure 1:
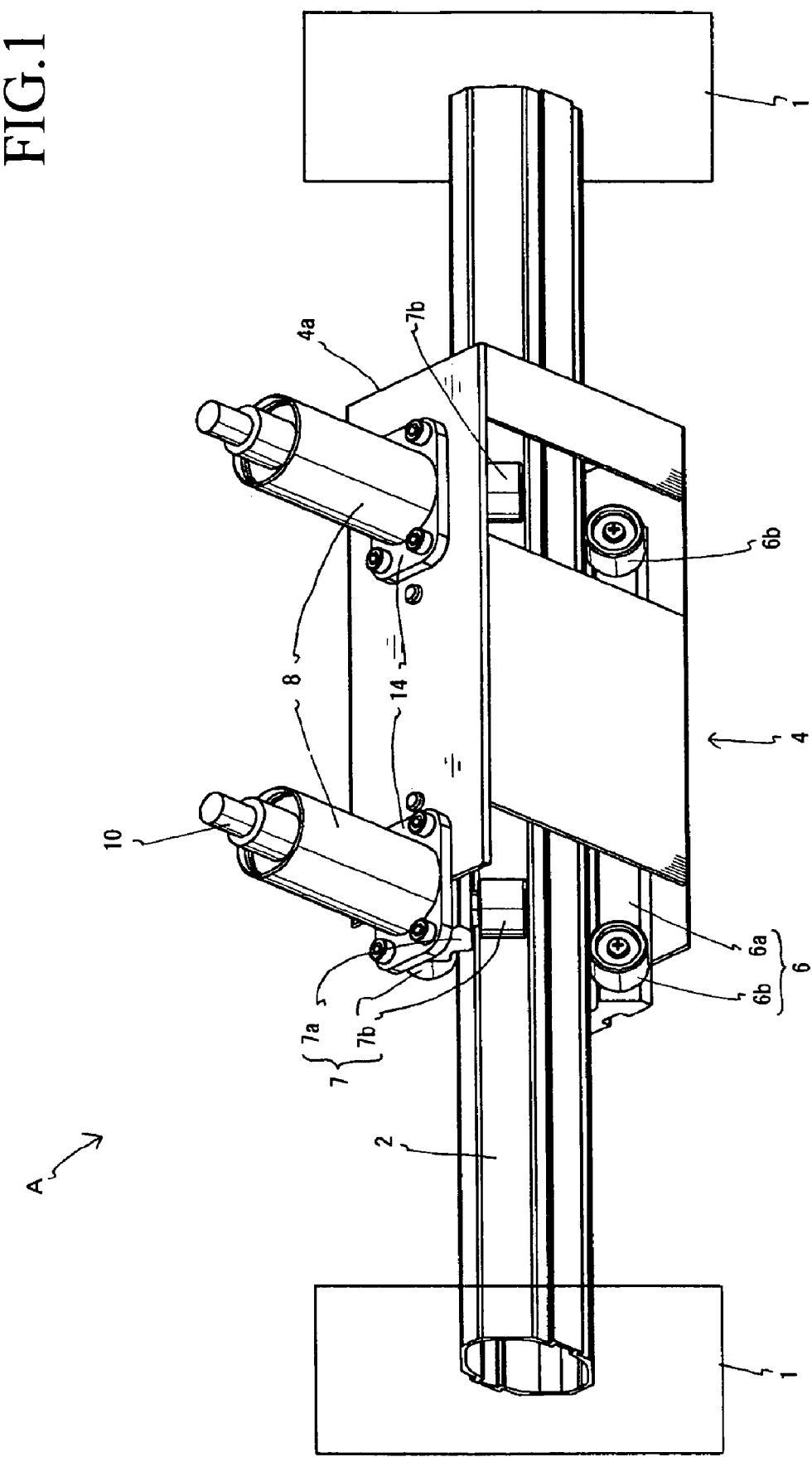
FIG. 1 is a perspective view of a linear actuating device, which is a first embodiment of an actuating device of the present invention.
Figure 2:
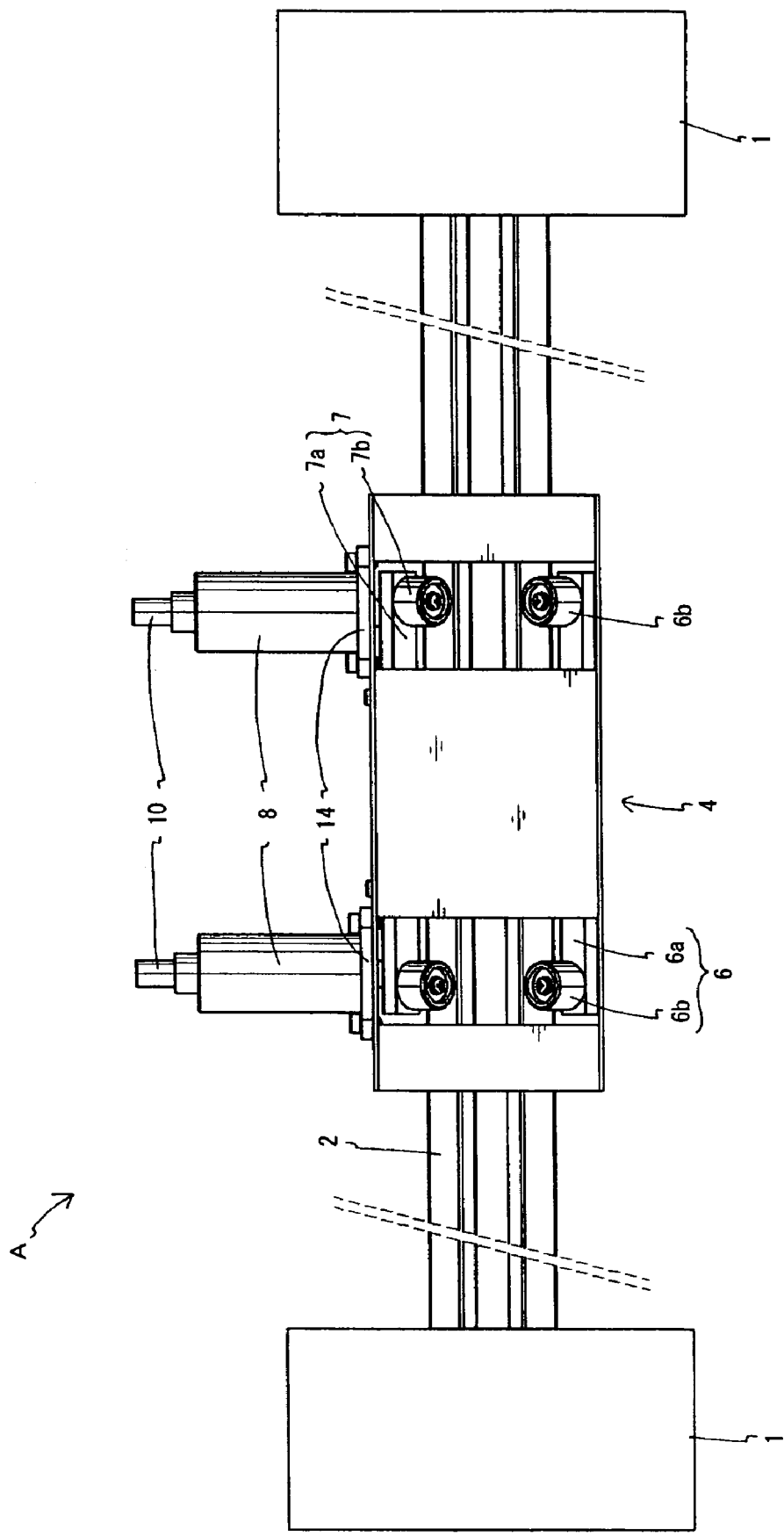
FIG. 2 is a front view of the linear actuating device of the first embodiment.
Figure 3:
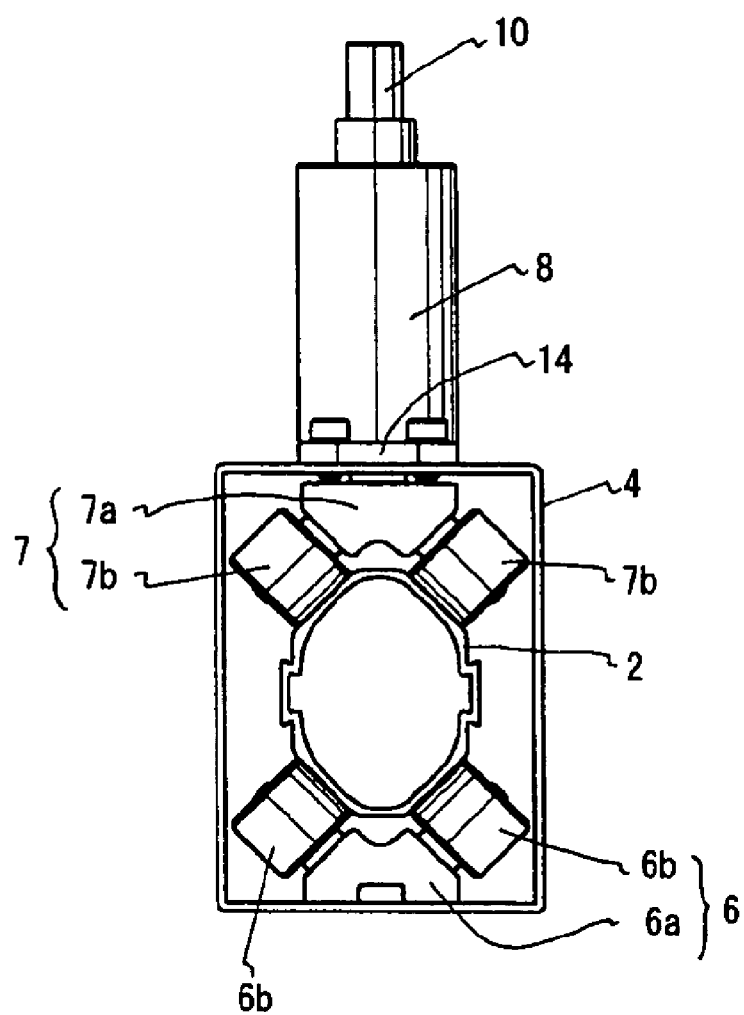
FIG. 3 is a side view of the linear actuating device of the first embodiment.

FIG. 1 is a perspective view of a linear actuating device A, which is a first embodiment of an actuating device of the present invention; FIG. 2 is a front view of the device; and FIG. 3 is a side view of the device.

The linear actuating device A comprises: a rail 2, whose ends are fixed to bases 1; a moving body 4, which can linearly reciprocally move along the rail 2; roller units 6 and 7, which contact the rail 2 as contact bodies; and pressure units 8, which are provided to the moving body 4 and capable of always pressing the roller units 7 onto the rail 2 with a prescribed force.

A section of the rail 2 is formed into a hexagonal cylindrical shape. The rail 2 is made of a light metal, e.g., aluminum alloy, and shaped by, for example, extrusion molding.

A section of the moving body 4 is formed into a rectangular cylindrical shape, and sectional are is larger than that of the rail 2. The moving body 4 covers the rail 2.

The roller units 6 are provided to one of inner faces of the moving body 4. Each of the roller units 6 comprises a base 6a, which is fixed to the inner face of the moving body 4, and rollers 6b, which are rotatably attached to the base 6a and respectively contact two adjacent outer faces of the rail 2. Two of the rollers 6b contact each of the outer faces of the rail 2. Each of the rollers 6b includes a ball bearing so as to smoothly rotate.

The roller units 7 and the pressure units 8 are attached to a wall 4a of the moving body 4, which is opposite to the inner face, to which the roller units 6 are provided.

The pressure units 8 are fixed on an outer face of the wall 4a. The wall 4a has through-holes, and rods 10 (see FIG. 4) of the pressure units 8 are respectively pierced through the through-holes and inwardly projected from an inner face of the wall 4a.

Each of the roller units 7 comprises a base 7a, which is fixed to the rod 10 of the pressure unit 8, and rollers 7b, which are rotatably attached to the base 7a and respectively contact two adjacent outer faces of the rail 2, which are opposite to the outer faces contacting the rollers 6b. Two of the rollers 7b contact each of the outer faces of the rail 2. Each of the rollers 7b includes a ball bearing so as to smoothly rotate.

In the linear actuating device A, the rods 10 of the pressure units 8 press the moving body 4 onto the rail 2 with prescribed forces, and the moving body 4 is guided by the roller units 6 and 7, which act as contact bodies, so that the moving body 4 can be linearly reciprocally moved along the rail 2.

To self-propel the moving body 4, suitable means for rotating the rollers 6b or 7b, e.g., motor, may be attached to the moving body 4.

Next, the pressure unit 8 will be explained.

Figure 4:
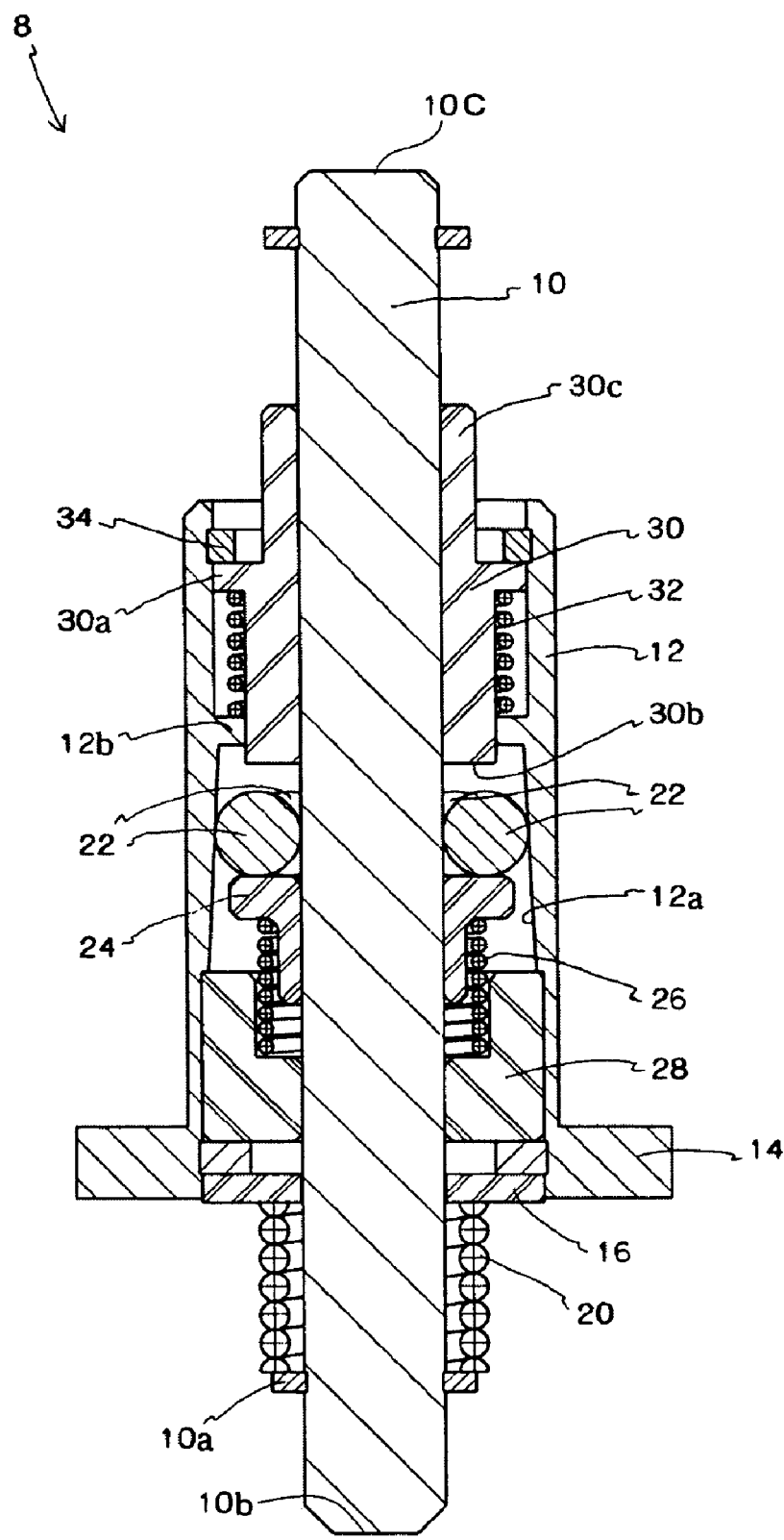
FIG. 4 is a sectional view of a pressure unit.

FIG. 4 is a sectional view of the pressure unit 8.

The pressure unit 8 has the rod 10 and a casing 12, which is formed like a circular cylinder. The rod 10 is coaxially pierced through the casing 12, so the casing 12 covers a part of the rod 10. An inner circumferential face of the casing 12 is separated from an outer circumferential face of the rod 10.

A flange 14 is formed at one end (a lower end in FIG. 4) of the casing 12, and screw holes for fixing the casing 12 to the moving body 4 are bored in the flange 14.

The pressure unit 8 is fixed to the moving body 4 by screwing the casing 12 together with the flange 14.

Both ends 10b and 10c of the rod 10 are projected from the casing 12. As shown in FIG. 3, the one end (the lower end in FIG. 4) 10b of the rod 10 is connected to the base 7a of the roller unit 7. The rod 10 is capable of moving in the axial direction of the 12, so that the rod 10 is capable of moving to and away from the rail 2.

As shown in FIG. 4, a first spring 20 always biases the rod 10 toward the roller unit 7 as a first biasing member. This biasing direction is a pressing direction for pressing the roller unit 7 onto the rail 2. One end of the first spring 20 contacts a member 16, which is provided to the one end 10a of the casing 12; the other end of the first spring 20 contacts an extended part 10a of the rod 10. With this structure, the first spring 20 always biases the rod 10 downward or in the pressing direction.

The inner circumferential face of the casing 12 includes a slope face part 12a. Distance between the slope face part 12a and the outer circumferential face of the rod 10 is gradually reduced toward the other end 10c of the rod 10. In other word, the distance is gradually increased in the pressing direction.

A plurality of spherical bodies 22 are provided in the casing 12, and they contact the slope face part 12a and the outer circumferential face of the rod 10. The spherical bodies 22 are circularly arranged to enclose the rod 10.

A cylindrical pressing member 24 is provided in the casing 12, and an upper face of the pressing member 24 contacts lower ends of the spherical bodies 22. The rod 10 is slidably fitted in the pressing member 24. A second spring 26 always biases the pressing member 24 in a direction opposite to the pressing direction as a second biasing member. With this structure, the second spring 26 biases the spherical bodies 22 in said direction. One end of the second spring 26 contacts an extended part 12b of the casing 12; the other end of the second spring 26 contacts a releasing member 30.

As shown in FIG. 4, an extended part 30a is outwardly extended from a mid part of an outer circumferential face of the releasing member 30. The extended section 30a is engaged with an engaging section 34, which is provided at an upper end of the casing 12. With this structure, the movement of the releasing member 30 in a direction opposite to the pressing direction is restrained by the engaging section 34. In a normal state, the releasing member 30 contacts the engaging member 34 and stands still at the shown initial position. At the initial position, a lower end 30b of the releasing member 30 is separated from the spherical bodies 22; the other end 30c of the releasing member 30 is projected outward from an upper end of the casing 12.

In the linear actuating device A, the first springs 20 of the pressure units 8 biases the rods 10 so as to press the roller units 7 onto the rail 2. When clearances are formed between the rollers 7b of the roller unit 7 and the rail 2 by abrasion, the first springs 20 biases the rods 10 and the roller units 7 toward the rail 2, so that the clearances can be eliminated. On the other hand, if an external force is applied from the rail 2 to the rods 10 against the elasticity of the first springs 20 while the moving body 4 moves, the spherical bodies 22 are moved toward the other ends 10c of the rods 10. However, in each pressure unit 8, the distance between the slope face part 12a and the outer circumferential face of the rod 10 is gradually reduced toward the other end 10c of the rod 10, so that the spherical bodies 22 are tightly fitted and engaged therebetween. Therefore, the reverse movement of the rods 10 can be prohibited.

As described above, the clearances between the rail 2 and the roller units 7, which are formed by abrasion, etc., can be eliminated by moving the rods 10. Further, even if a great external force is applied while the moving body 4 moves, the reverse movement of the rods 10 are prohibited. Therefore, no clearances are formed between the rails 2 and the roller units 7, so that the moving body 4 can move without plays. The first springs 20 are used for moving the rods 10 so as to eliminate the clearances between the rail 2 and the roller units 7, so great elasticity, which counterworks to the great external force, is not required for the first springs 20.

The spherical bodies 22 are pressed together with the pressing members 24 by the second springs 26, so that they always contact the rods 10 and the slope face parts 12a of the casings 12. Therefore, when an external force against the elasticity of the first springs 20 is applied to the rods 10, the reverse movement of the rods 10 can be quickly restrained.

As described above, the spherical bodies 22 are circularly arranged along the outer circumferential faces of the rods 22. When the external force against the elasticity of the first springs 20 is applied to the rods 10, forces applied to the rods 10 and the slope face parts 12a are dispersed to the spherical bodies 22. Therefore, the forces applied to each spherical body 22, each rod 10 and each slope face part 12a can be reduced, so that over-biting the spherical bodies 22 and damaging the rods 10, the casings 12 and the spherical bodies 22 can be prevented. Further, the moving body 4 can be moved stably.

As described above, in each of the pressure units 8, the rod 10 is always biased in the pressing direction by the first spring 20, and the reverse movement of the rod 10 can be prohibited by the spherical bodies 22 and the slope face part 12*a* of the casing 12. When the pressure unit 8 is attached to the moving body 4, if the rod 10 is excessively moved in the pressing direction, the rod 10 cannot return to an initial position. Namely, the pressure unit 8 cannot be attached.

To solve this problem, the pressure unit 8 includes the releasing member 30. By operating the releasing member 30, the prohibiting function of the spherical bodies 22 can be removed. Namely, the rod 10 can be moved in the direction opposite to the pressing direction.

By pushing the upper end 30*c* of the releasing member 30, which is projected outward from the casing 12, downward or in the pressing direction, the releasing member 30 is moved in the pressing direction against elasticity of a third spring 32, which acts as a third biasing member. Then, the lower end 30*b* of the releasing member 30 contacts and moves the spherical bodies 22 downward or in the pressing direction, so that the spherical bodies 22 are moved in the pressing direction against the elasticity of the second spring 26.

Since the distance from the slope face part 12*a* to the rod 10 is gradually increased toward the lower end 10*b* of the rod 10, the spherical bodies 22 are separated from the slope face part 12*a* and the rod 10 with moving downward or in the pressing direction. Therefore, the spherical bodies 22 release the rod 10, and the rod 10 can be moved upward.

With this action, the pressure units 8 can be attached or reused.

Second Embodiment

A second embodiment of the present invention will be explained.

Figure 5:
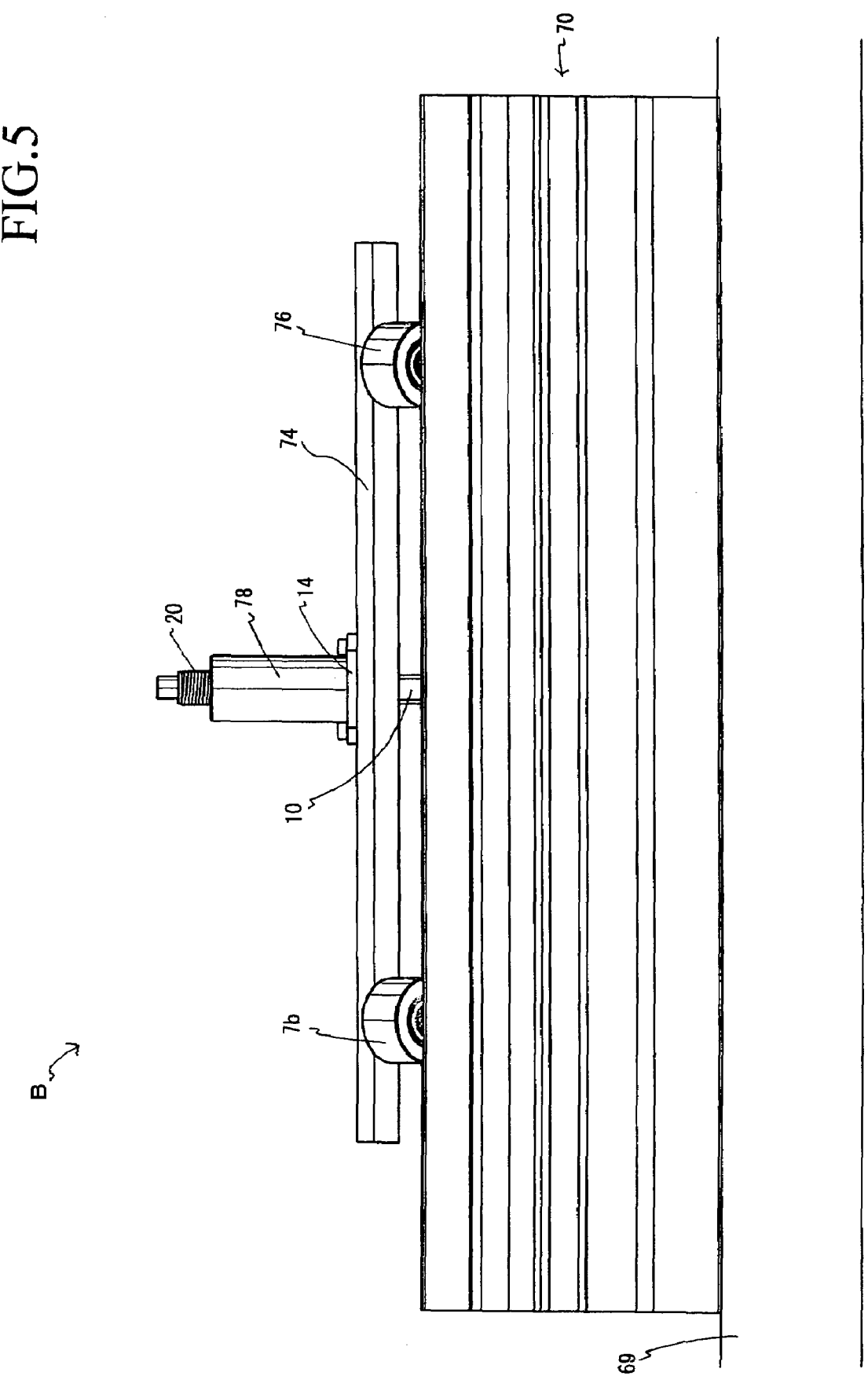
FIG. 5 is a front view of a linear actuating device, which is a second embodiment of an actuating device of the present invention.
Figure 6:
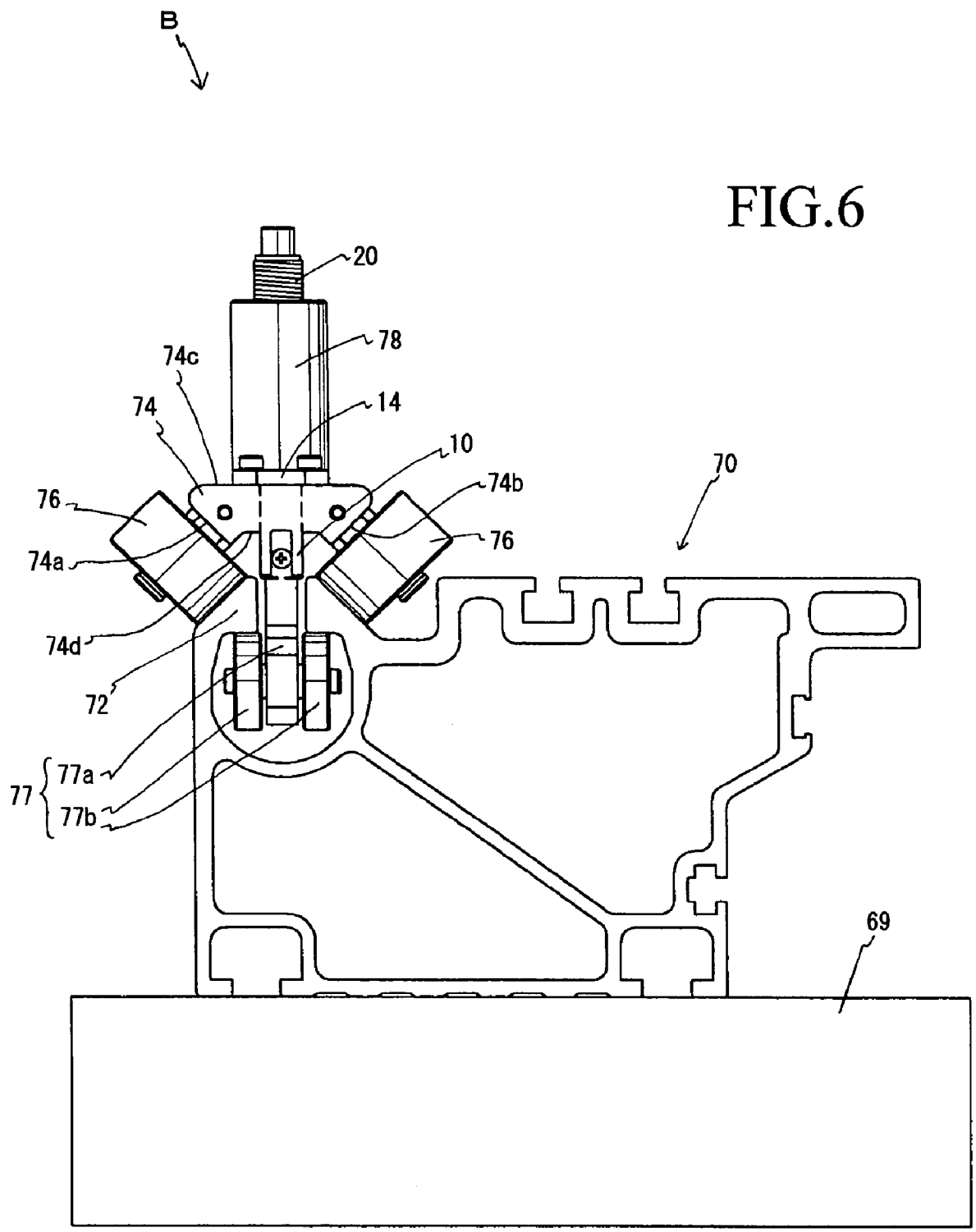
FIG. 6 is a side view of the linear actuating device of the second embodiment.

FIG. 5 is a front view of a linear actuating device B, which is a second embodiment of an actuating device of the present invention, and FIG. 6 is a side view thereof.

The linear actuating device B comprises: a base member 70 fixed to a base 69; a rail 2 integrated with the base member 70; a moving body 74, which can linearly reciprocally move along the rail 72; roller units 76 and 77, which contact the rail 72 as contact bodies; and a pressure unit 78, which is provided to the moving body 74 and capable of always pressing the roller unit 77 onto the rail 72 with a prescribed force.

A section of the rail 72 is formed into a C-shape. The rail 72 is made of a light metal, e.g., aluminum alloy, and shaped by, for example, extrusion molding. Preferably, the rail 72 is integrated with the base member 70.

The moving body 74 is an elongated plate, whose section is formed into a trapezoid. A short side 74*d* of the trapezoid section faces the open part of the C-shape of the rail 72. The elongated moving body 74 is arranged along the rail 72.

Roller units 76 are provided to slope faces 74*a* and 74*b* of the moving body 74. Two of the roller units 76, which are arranged in the longitudinal direction of the moving body 74, contact each outer edge of the open part of the rail 72. Each of the roller units 76 includes a ball bearing, etc. so as to smoothly rotate.

The pressure unit 78 is fixed on a long side 74*c* of the trapezoid section of the moving body 74. The pressure unit 78 is provided between the roller units 76, which are arranged in the longitudinal direction of the moving body 74. Note that, a structure of the pressure unit 80 is similar to that of the pressure unit 8 of the first embodiment.

A through-hole is bored in the moving body 74 from the long side 74*c* to the short side 74*d*. The rod 10 of the pressure unit 78 is pierced through the through-hole and extended to an inner space of the open part of the rail 72. The roller unit 77 comprises a base 77*a* and two rollers 77*b*. The base 77*a* is fixed to the lower end of the rod 10, and the rollers 77*b* are rotatably attached to the base 77*a*. Two of the rollers 77*b* are located in the inner space of the open part of the rail 72 and respectively contact inner edges thereof. Each of the rollers 77 includes a ball bearing, etc. so as to smoothly rotate.

In the pressure unit 78, the rod 10 is biased upward or toward the casing of the pressure unit 78. By biasing the rod 10 upward, the roller unit 77 is pressed onto the rail 72 with a prescribed force.

In the linear actuating device B, the rods 10 of the pressure units 8 is biased upward, so that the moving body 74 is pressed onto the rail 72 with the prescribed force. In this state, the moving body 74 is guided by the roller units 76 and 77, which act as guide sections and the contact bodies, so that the moving body 74 can be linearly reciprocally moved along the rail 72.

To self-propel the moving body 74, suitable means for rotating the roller units 76 or 77 (or another roller unit), e.g., motor, may be attached to the moving body 74.

As described above, the structure of the pressure unit 78 is similar to that of the pressure unit 8 of the first embodiment. However, in the linear actuating device B of the second embodiment, the rod 10 is biased upward in FIGS. 5 and 6 so as to apply the pressing force. The pressure unit 78 is realized by inverting the pressure unit 8 shown in FIG. 4. Namely, the end 10*c* of the rod 10 (see FIG. 4) may be connected to the roller unit 77 of the linear actuating device B.

Note that, in the pressure unit 78, the flange 14 (see FIG. 4) is provided to the other end of the casing 12.

Further, an opening section (not shown) may be formed in the casing 12 of the pressure unit 78. A lever of the releasing member 30 may be projected outward. In this structure, a user easily operate the releasing member 30.

The linear actuating device B including the pressure unit 78 has effects the same as those of the linear actuating device A of the first embodiment including the pressure units 8.

Third Embodiment

In the first and the second embodiments, the moving bodies 7 and 74 are linearly moved along the fixed rails 2 and 72, which are respectively fixed to the base 1 and 69.

Figure 7:
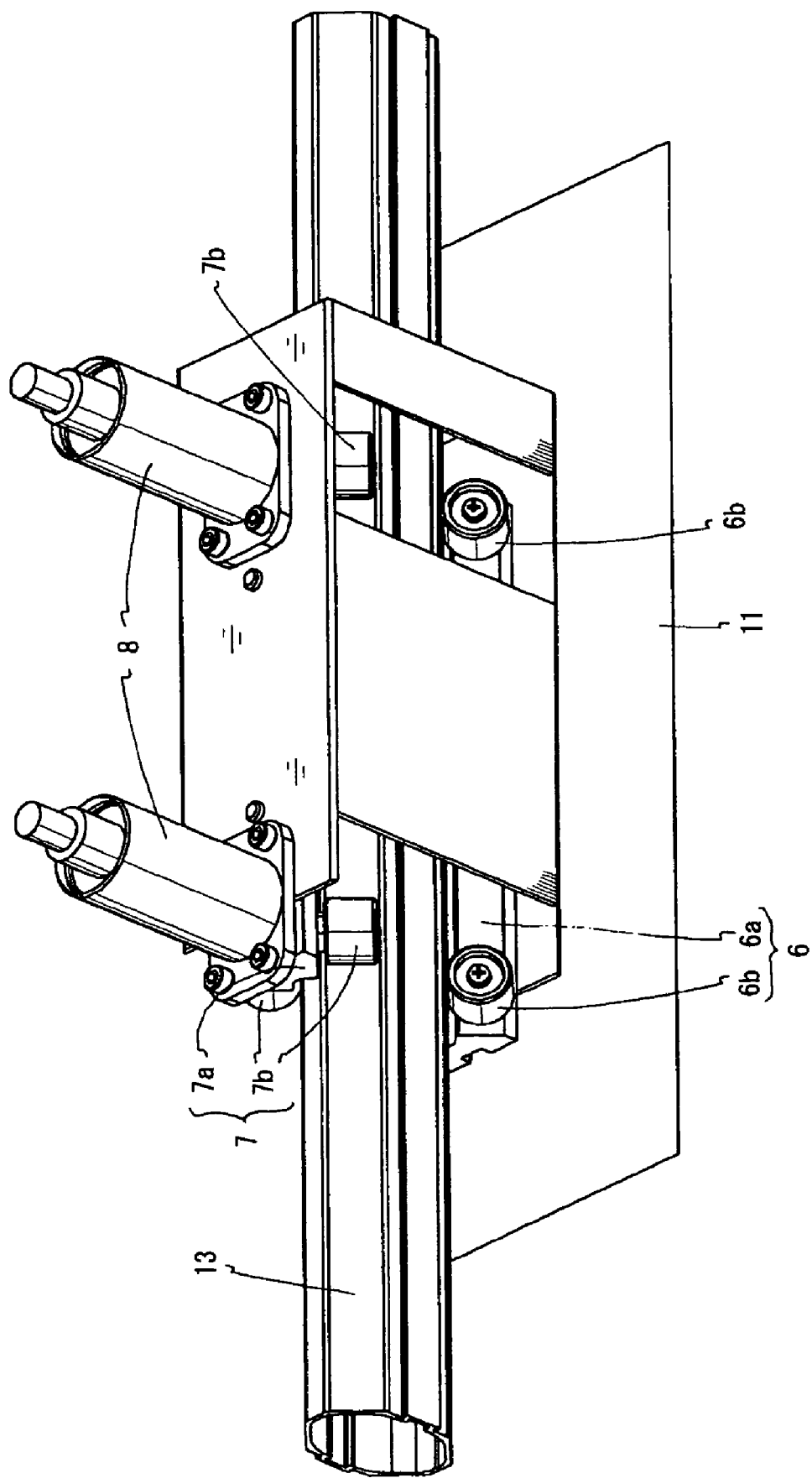
FIG. 7 is perspective view of a linear actuating device of a third embodiment, in which a rail-shaped moving body is moved along a guide section.

FIG. 7 is a perspective view of the actuating device of a third embodiment. A rail-shaped moving body 13 is guided by the roller units 6 and 7 and linearly moved. The pressure units 8, which are provided to a base 11, apply pressure to the moving body 13. Note that, the roller units 6 and 7, which act as the guide section, and the pressure units 8 are the same as those employed in the former embodiments.

Namely, the roller units 6 and 7, which act as the guide section and the contact bodies, and the pressure units 8 are provided to the base 11, and the rail-shaped moving body 13 is guided by the roller units 6 and 7 to linearly move. The pressure units 8 press the roller units 7 onto the moving body 13.

In the above described embodiments, the rods 10 of the pressure units 8 and 78 directly contact the roller units 7 and 77, which act as the contact bodies. The rods 10 may be indirectly contact the contact bodies, e.g., roller units 7 and 77, with transmitting members.

The actuating device of the present invention can be applied to many mechanisms, in which a pressing force is applied to a moving body or a rail. Further, the rail may be a curved rail. In this case, the moving body performs a curvilinear motion.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An actuating device, comprising:
a fixed rail;
a moving body being guided by said rail;
a contact body contacting said rail; and
a pressure unit being provided to said moving body, said pressure unit always biasing said contact body toward said rail or in a pressing direction,
wherein said pressure unit comprises:
a rod having one end, which directly or indirectly contacts said moving body, and the other end, the rod being capable of moving in the pressing direction;
a first biasing member biasing the rod in the pressing direction;
a casing covering at least a part of an outer circumferential face of the rod, the casing having an inner circumferential face, whose distance from the outer circumferential face of the rod is gradually reduced toward the other end of the rod; and
a spherical body being provided in the casing, the spherical body contacting the inner circumferential face of the casing and the outer circumferential face of the rod.

2. The actuating device according to claim 1,
wherein said pressure unit further has a second biasing member biasing the spherical body in the direction opposite to the pressing direction.

3. The actuating device according to claim 1,
wherein a plurality of the spherical bodies are arranged along the outer circumferential face of the rod.

4. The actuating device according to claim 1,
wherein said pressure unit further has a releasing member being provided on the other end side with respect to the spherical body and capable of moving the spherical body in the pressing direction when the releasing member is moved in the pressing direction.

5. The actuating device according to claim 4,
wherein said pressure unit further has a third biasing member always biasing the releasing member in the direction opposite to the pressing direction.

6. An actuating device, comprising:
a fixed guide section;
a moving body being guided by said guide section;
a contact body contacting said moving body; and
a pressure unit being provided to said guide section, said pressure unit always biasing said contact body toward said moving body or in a pressing direction,
wherein said pressure unit comprises:
a rod having one end, which directly or indirectly contacts said moving body, and the other end, the rod being capable of moving in the pressing direction;
a first biasing member biasing the rod in the pressing direction;
a casing covering at least a part of an outer circumferential face of the rod, the casing having an inner circumferential face, whose distance from the outer circumferential face of the rod is gradually reduced toward the other end of the rod; and
a spherical body being provided in the casing, the spherical body contacting the inner circumferential face of the casing and the outer circumferential face of the rod.

7. The actuating device according to claim 6,
wherein said pressure unit further has a second biasing member biasing the spherical body in the direction opposite to the pressing direction.

8. The actuating device according to claim 6,
wherein a plurality of the spherical bodies are arranged along the outer circumferential face of the rod.

9. The actuating device according to claim 6,
wherein said pressure unit further has a releasing member being provided on the other end side with respect to the spherical body and capable of moving the spherical body in the pressing direction when the releasing member is moved in the pressing direction.

10. The actuating device according to claim 9,
wherein said pressure unit further has a third biasing member always biasing the releasing member in the direction opposite to the pressing direction.

* * * * *